United States Patent [19]
Marshall

[11] 3,755,182
[45] Aug. 28, 1973

[54] NITROGEN GENERATING COMPOSITIONS
[75] Inventor: Mervin D. Marshall, Fombell, Pa.
[73] Assignee: Mine Safety Appliances Company, Pittsburgh, Pa.
[22] Filed: Jan. 27, 1972
[21] Appl. No.: 221,391

[52] U.S. Cl............... 252/188.3, 252/350, 423/351
[51] Int. Cl. ......................... C09k 3/00, C01b 21/00
[58] Field of Search................. 423/351; 252/188.3, 252/350, 408, 181.4

[56] References Cited
OTHER PUBLICATIONS

Jacobson: Encyclopedia of Chemical Reactions, Vol. VI, (1956), p. 307

Mellor: A Comprehensive Treatise on Inorganic & Theoretical Chemistry, Vol. 8, (1928), p. 338

Primary Examiner—Oscar R. Vertiz
Assistant Examiner—Hoke S. Miller
Attorney—Ronald H. Shakely

[57] ABSTRACT

Compositions of sodium azide and polyvalent metal sulfates burn when ignited to produce nitrogen.

4 Claims, No Drawings

NITROGEN GENERATING COMPOSITIONS

This invention relates to compositions for producing nitrogen and more particularly to combustible compositions that liberate nitrogen on burning.

The compositions of this invention are stable at ordinary temperatures and when ignited, burn with a self-sustained flameless combustion reaction. In this respect, the compositions are similar to the well known chlorate candle for producing oxygen and the compositions of this invention are generally used in the same manner, to produce nitrogen, as oxygen candles are used to produce oxygen. The compositions are placed in a container with suitable outlets and the ignition means, are ignited and as combustion progresses, the produced nitrogen is discharged from the container.

Nitrogen has been produced from the thermal decomposition of sodium azide but, although the gas is very pure nitrogen, the reaction produces sodium in stoichiometric quantities. The production of sodium has been reduced by reacting sodium azide with sodium nitrate to at least partially direct the reaction to the production of sodium oxide. In practice, however, three problems arise when using this reaction for gas generation: (1) the reaction is extremely rapid, almost to the point of being explosive; (2) a large amount of heat is liberated, i.e., the reaction is extremely exothermic; and (3) free sodium is still produced. The reaction has even been used to liberate a sodium vapor cloud from high altitude balloons for upper atmosphere studies. For some purposes, as in providing gas for underwater bouyancy applications, the presence of sodium may be inconsequential, but high heat production and extremely rapid reactions can cause damage or rupture of the device being filled. To other uses, as when generating gas for balloon inflation or breathing purposes, the presence of sodium in the gas is undesirable and dangerous.

It is accordingly an object of this invention to provide a nitrogen producing combustible composition in which the combustion reaction proceeds at a slow, practical rate and has a lower heat of reaction than prior compositions. Another object is to provide such compositions that produce no sodium on combustion. Other objects will be apparent from the following description and claims.

This invention based on my discovery that compositions of sodium azide with polyvalent metal sulfates or their hydrates will burn to produce nitrogen at a moderate reaction rate with a moderate heat of reaction. Such compositions burn with the generation of substantially no sodium when the proportion of sodium azide is sufficiently low, suitably less than about 3 moles of sodium azide for each molecular equivalent of sulfate ion; that is, for example, not more than about 3 moles of sodium azide for each mole of a bivalent metal sulfate, such as $CaSO_4$, or not more than about 9 moles of sodium azide for each mole of trivalent metal sulfate such as $Al_2(SO_4)_3$. Lower proportions of sodium azide may be used, suitably proportions as low as about 2 moles of sodium azide to each molecular equivalent of sulfate ion, to provide slower rates of gas generation with somewhat lower yields of gas; with still lower proportions of sulfate, ignition and self-sustained combustion of the composition is not reliable. Higher proportions of sodium azide, suitably up to 8 moles or more of $NaN_3$ to each molecular equivalent of sulfate ion, can be used for purposes in which sodium can be tolerated. The proportion of 8 moles of $NaN_3$ for each molecular equivalent of sulfate ion is stoichiometric for the major reaction, for example:

$$8 NaN_3 + CaSO_4 \rightarrow 4 Na_2O + CaS + 12N_2.$$

Any polyvalent metal sulfate or hydrate thereof may be used, such as, for example, aluminum sulfate ($Al_2(SO_4)_3$), aluminum sulfate hexahydrate ($Al_2(SO_4)_3 \cdot 6H_2O$) or magnesium sulfate ($MgSO_4$). Calcium sulfate ($CaSO_4$) or its hydrates, such as calcium sulfate hemihydrate ($CaSO_4 \cdot 1/2H_2O$) or calcium sulfate dihydrate ($CaSO_4 \cdot 2H_2O$), are generally preferred. Mixtures of suitable sulfates may be used, if desired, to adjust the burning rates and other characteristics of the compositions. It should be recognized that inert fillers can also be used to modify the burning characteristics.

In an example illustrative of this invention, 16.7 g. of finely divided sodium azide and 12.95 g. of finely divided calcium sulfate (2.7 moles of $NaN_3$ per mole of $CaSO_4$) were mixed thoroughly. The mixture was then pressed behind a protective shield, at 40,000 psig. in a combination diereactor measuring 3.8 cm. in diameter and 5.9 cm. deep. After closing, the reactor was connected through a glass wool filter to a dry gas meter. Ignition of the charge was accomplished by an electric match which ignited a small chemical thermite-type charge placed against one edge of the charge. The charge burned at a linear rate of about 2.5 inches/minute, producing 5.7 liters of gas of a composition approximately 99 percent $N_2$ and 1 percent hydrogen. The maximum gas temperature at the tube outlet did not exceed 300° C. The solid residue and filter were tested for free sodium by treatment with water; no sodium was present.

When the same procedure was followed except that 11.0 g. of $NaN_3$ and 5.6 g. of $CaSO_4$ were used, the burning rate exceeded 10 inches per minute and a significant amount of sodium was produced. With further increasing amounts of sodium azide, e.g. 8 moles of $NaN_3$ per mole of $CaSO_4$, the reaction rate and amount of sodium produced increased; even at this proportion, however, the reation rate was moderate and not explosively rapid as is the case when sodium azide is reacted with sodium nitrate.

I claim:

1. A combustible composition stable at ordinary temperatures that when ignited burns to liberate nitrogen consisting essentially of a coherent compact of an intimate mixture of finely divided sodium azide and a finely divided metal sulfate selected from the group consisting of calcium sulfate, magnesium sulfate, aluminum sulfate, hydrates thereof and mixtures thereof containing at least about 1 molecular equivalent of sulfate ion for each 8 moles of sodium azide.

2. A composition according to claim 1 in which the sulfate is calcium sulfate.

3. A composition according to claim 1 containing less than about 3 moles of sodium azide for each molecular equivalent of sulfate ion.

4. A composition according to claim 3 in which the sulfate is calcium sulfate.

* * * * *